(12) United States Patent
Metz

(10) Patent No.: US 6,390,245 B1
(45) Date of Patent: May 21, 2002

(54) WHEEL CHOCK WITH HANDLE

(76) Inventor: Donald Metz, c/o DL Manufacturing 7000 Airways Park Dr., E. Syracuse, NY (US) 13057

( * ) Notice: Subject to any disclaimer, the term of this patent is extended or adjusted under 35 U.S.C. 154(b) by 0 days.

(21) Appl. No.: 09/571,870

(22) Filed: May 16, 2000

(51) Int. Cl.[7] .................................................. B60T 3/00
(52) U.S. Cl. ........................................... 188/32; 188/36
(58) Field of Search ........................... 188/4 R, 32, 36, 188/37; D12/278

(56) References Cited

U.S. PATENT DOCUMENTS

| | | | | |
|---|---|---|---|---|
| 2,773,564 A | * | 12/1956 | Gararo, Sr. ................... | 188/32 |
| D206,447 S | * | 12/1966 | Switzer ..................... | D12/217 |
| D236,823 S | * | 9/1975 | Switzer ..................... | D12/217 |
| D245,416 S | * | 8/1977 | Carpenter .................. | D12/217 |
| 4,917,219 A | * | 4/1990 | Henry .......................... | 188/32 |
| 5,685,397 A | * | 11/1997 | Maddox et al. ............... | 188/36 |
| 5,689,981 A | * | 11/1997 | De Luca et al. .............. | 188/32 |
| D389,796 S | * | 1/1998 | Olson ........................ | D12/217 |

* cited by examiner

Primary Examiner—Matthew C. Graham
(74) Attorney, Agent, or Firm—Sughrue Mion, PLLC

(57) ABSTRACT

A wheel chock assembly includes a wheel chock having a substantially triangular cross-section and a handle having a lower end detachably secured to the bottom wall of the wheel chock and an upper end having a hand grip secured thereto. The hand grip is disposed in a plane substantially perpendicular to a plane of a side wall of the wheel chock and the handle is provided with an intermediate portion connecting the upper and lower ends substantially orthogonally to each other. The handle is formed from a hollow continuous tube with the lower end thereof w adapted to rest on the ground beneath the wheel chock.

6 Claims, 5 Drawing Sheets

WHEEL CHOCK WITH HANDLE

BACKGROUND OF THE INVENTION

The present invention is directed to a wheel chock with a handle and more specifically with respect to a wheel chock having a detachable handle which is configured to facilitate the placement and removal of the wheel chock while enabling the wheel chock with the handle to be free standing in the upright position.

It is known in the art to provide wheel chocks with handle structures as evidenced by the U.S. patents to Slavico (U.S. Pat. No. 2,496,499), Taylor (U.S. Pat. No. 2,720,285), Maddox et al. (U.S. Pat. No. 5,685,397) and Clark (U.S. Pat. No. 5,913,389). None of these wheel chocks are designed to be free standing with the handle in the upright position. Each of these references disclose a handle having a hand grip at the upper end thereof but do not disclose or suggest the use of an open triangular shape hand grip portion to facilitate hanging the wheel chock on a peg when not in use.

SUMMARY OF THE INVENTION

The present invention provides a new and improved wheel chock assembly having a detachable handle having a hand grip at the upper end thereof and a ground engaging portion at the lower end thereof detachably connected to the bottom wall f the wheel chock and adapted to provide suitable leverage to facilitate the removal of the wheel chock from engagement with a wheel. The ground engaging portion, in conjunction with the substantially upright configuration of the handle enables the wheel chock and handle to remain in a free standing upright position when not engaged with a wheel. The hand grip is also configured as a closed loop to enable the wheel chock and handle assembly to be hung on a peg in a convenient location for ready use.

The specific nature of the invention, as well as advantages thereof, will clearly appear from the following description and from the accompanying drawings.

DETAILED DESCRIPTION OF THE INVENTION

Figure 1:
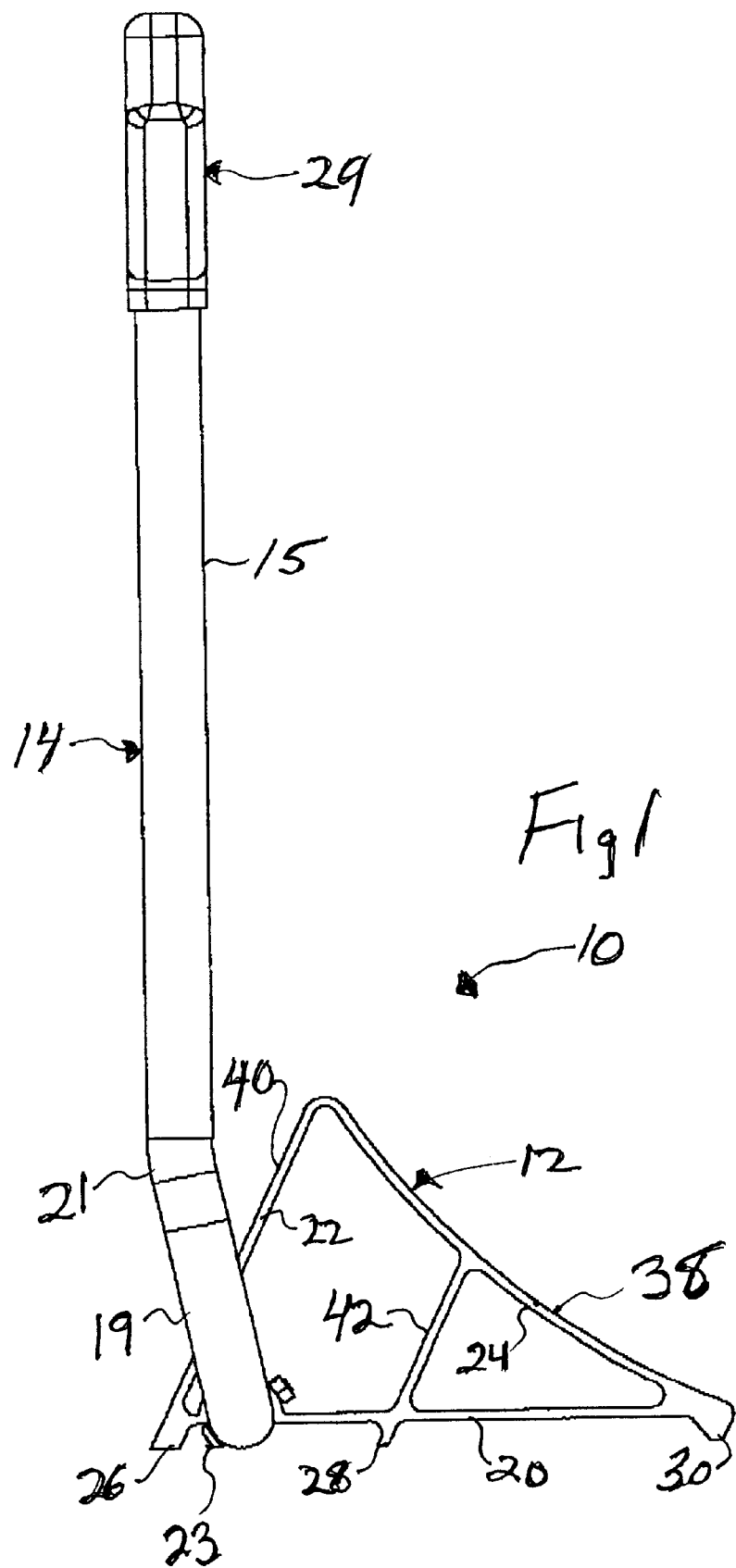
FIG. 1 is a side elevational view of the wheel chock and handle in the assembled condition according to the present invention.

The wheel chock and handle assembly 10 is comprised of a wheel chock 12 and a handle 14 which is detachably mounted in the wheel chock. The wheel chock 12 is provided with a substantially triangular configuration and includes a bottom wall 20, a front wall 22 and a rear wall 24. An internal brace 42 extends between the approximate mid points of the bottom wall 20 and the rear wall 24. The bottom wall 20 is provided With three parallel transversely extending ribs 26, 28 and 30 which are adapted to provide gripping engagement with the ground when the wheel chock is in place against a tire.

The bottom wall 20 of the wheel chock 12 is also provided with an upwardly extending semi-cylindrical recess 32 extending transversely of the wheel chock adjacent the front wall 22. The handle 14 is comprised of a continuous hollow metal tube having a straight vertically extending upper hollow tubular portion 15 and a lower horizontally extending hollow tubular portion 17 connected thereto by a curved intermediate hollow tubular portion 19. The upper portion 15 is offset from the plane containing the lower portion 17 and the intermediate portion 19 by means of a bent portion 21. The lower horizontal portion 17 is located in the transverse semi-cylindrical recess 32 and secured therein by means of two nut and bolt assemblies 23. The diameter of the hollow tubular portion 15 is such that the lower horizontally disposed portion 17 will lie in the same plane as the lower surfaces of the three ridges 26, 28 and 30. Thus, the lower portion 17 will rest directly on the ground.

Figure 2:
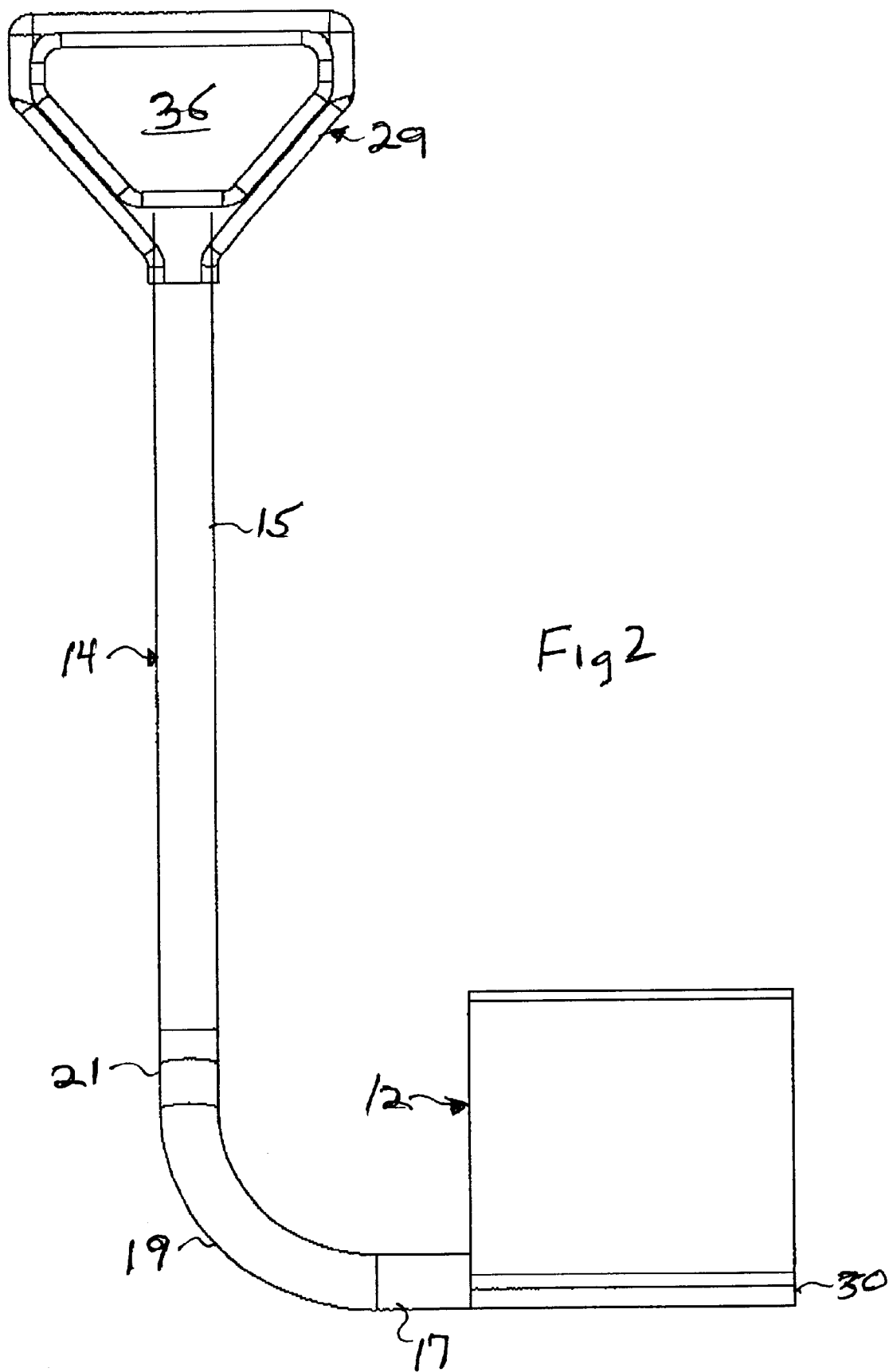
FIG. 2 is a rear elevational view thereof.
Figure 3:
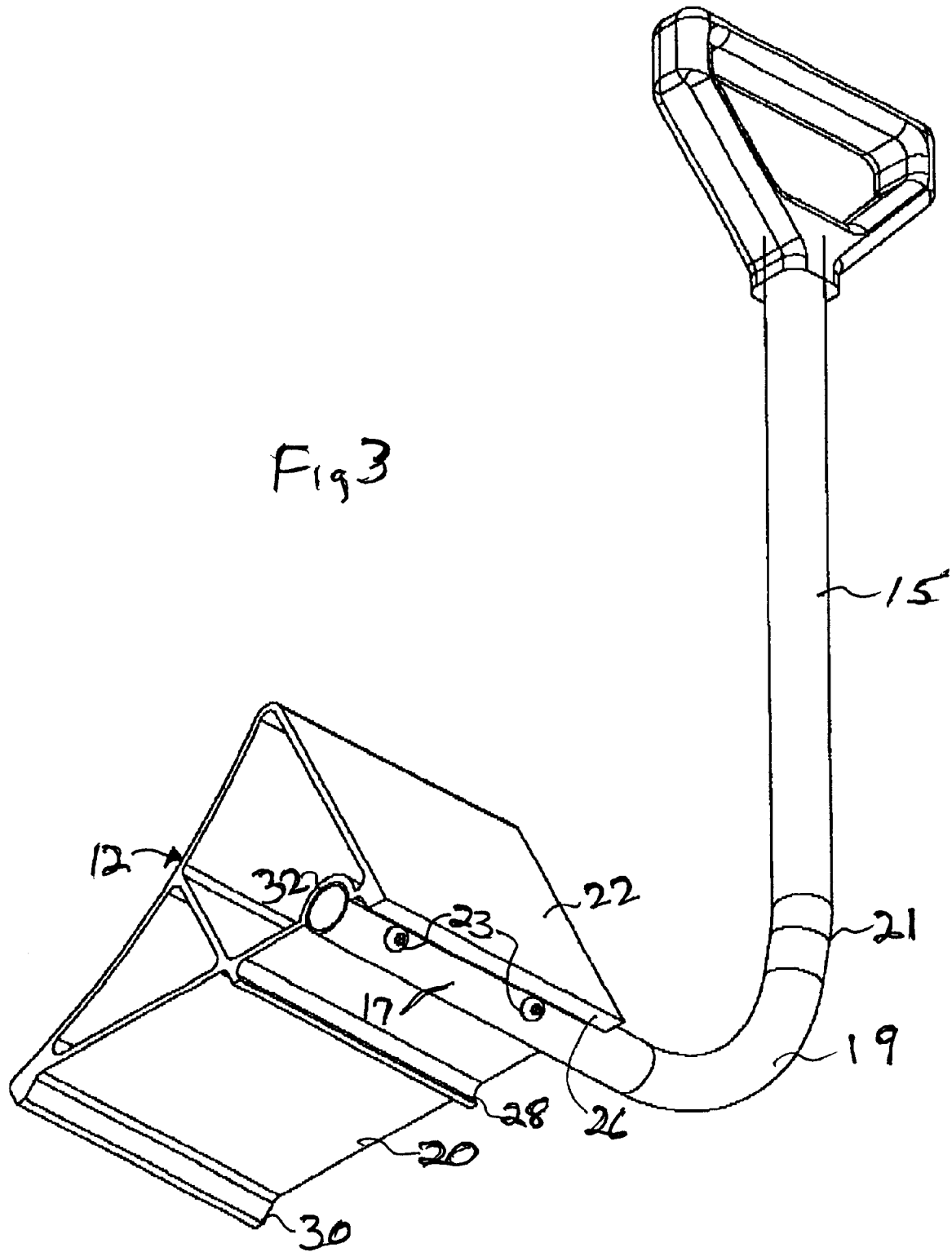
FIG. 3 is a perspective view of the wheel chock and handle assembly as viewed from the bottom and the side opposite the handle side of the wheel chock.
Figure 4:
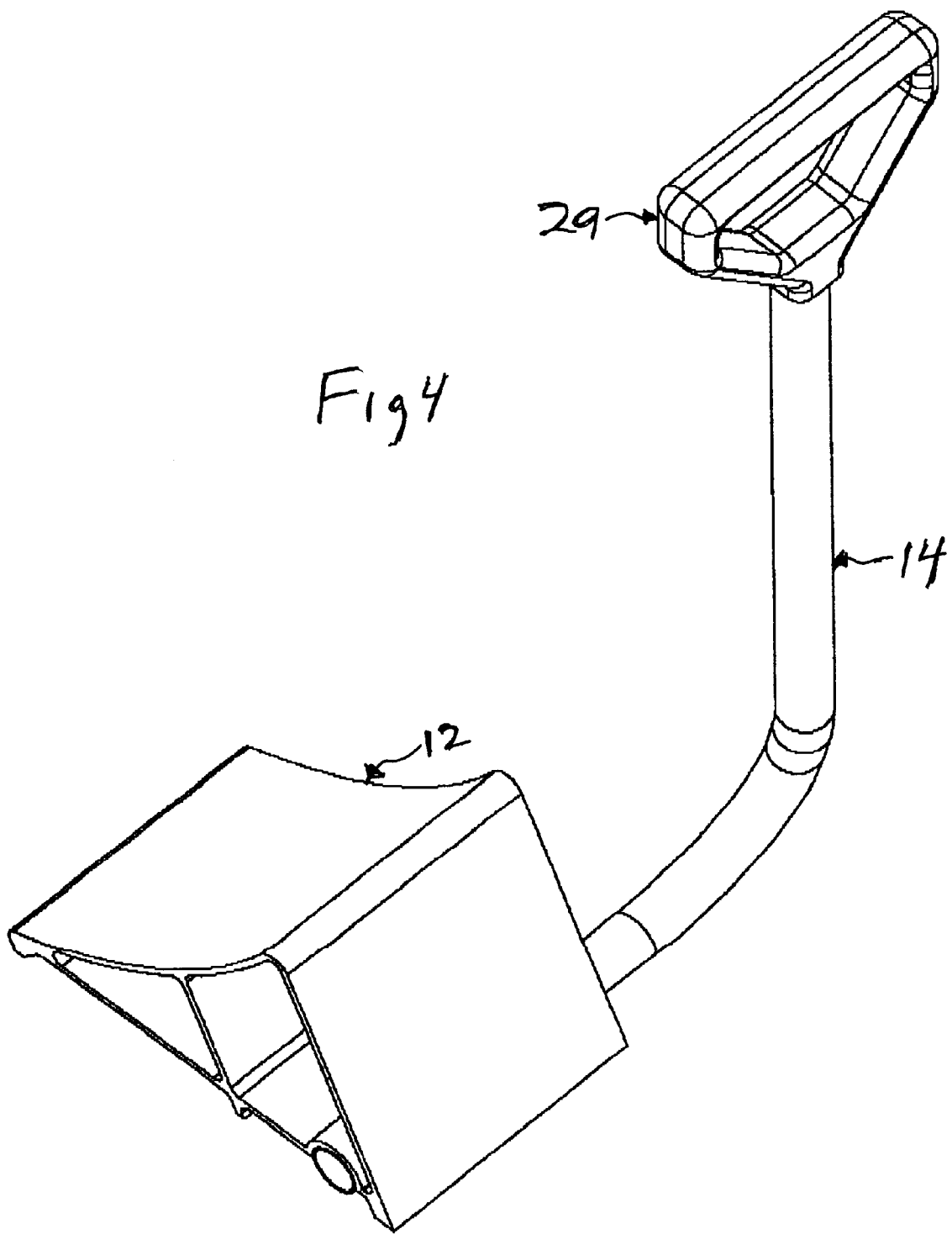
FIG. 4 is a second perspective view of the wheel chock and handle assembly as viewed from the top and the side opposite handle side of the wheel chock.
Figure 5:
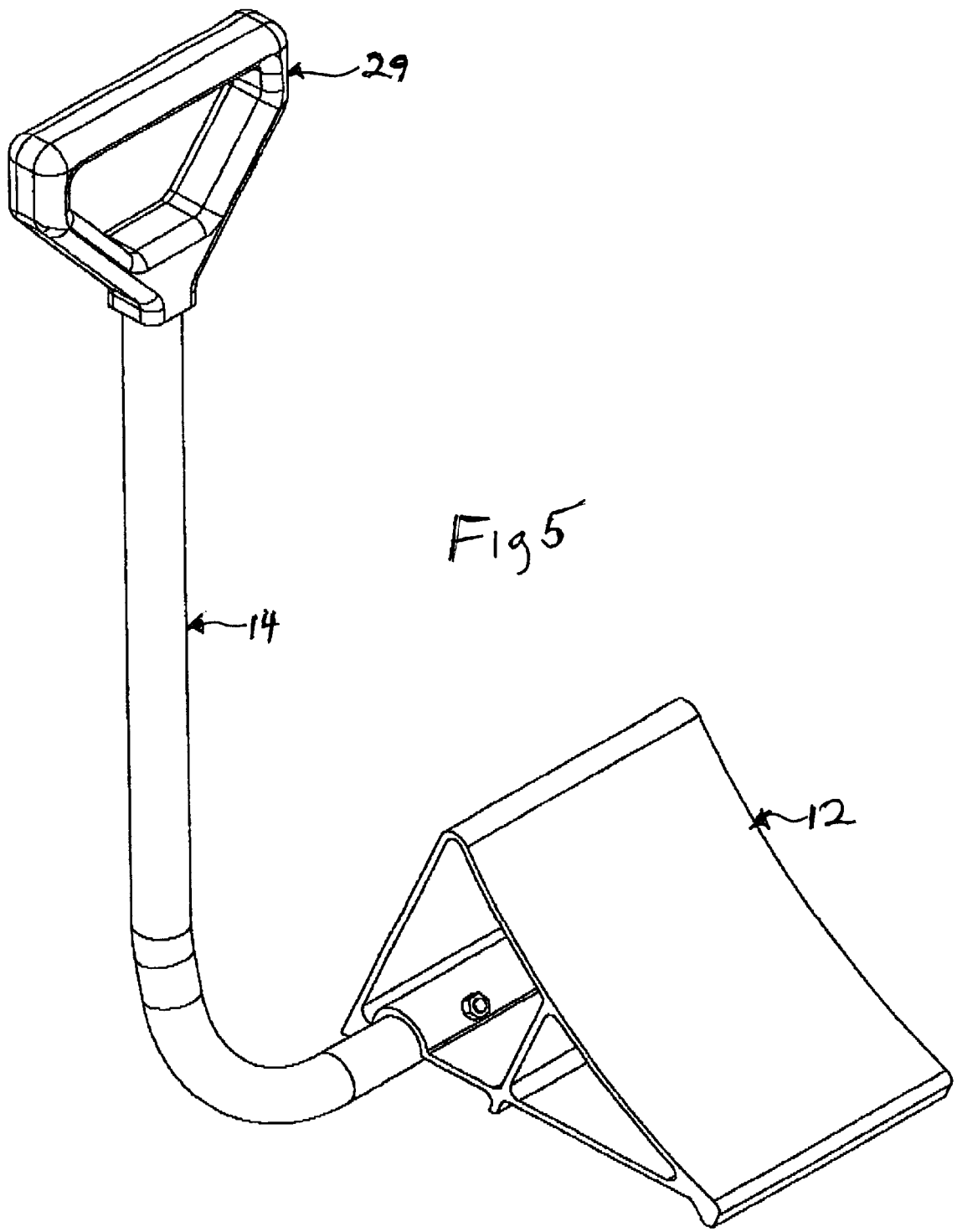
FIG. 5 is a third perspective view of the wheel chock and handle assembly as viewed from the rear and the handle of the wheel chock.

A hand grip 29 has a substantially triangular configuration extending perpendicular to the axis of the upper end of the tubular handle structure. The hand grip 29 may be secured to the upper hollow tubular portion 15 of the handle 14 by means of screw threads, welding, set screws or any other suitable connecting means. The triangular configuration of the hand grip provides an opening 36 which enables the wheel chock and handle assembly to be hung on a wall peg (not shown). The hand grip 29 is oriented so that the plane of the hand grip 29 is substantially perpendicular to the side of the wheel chock, as best seen in FIGS. 1 and 2.

The wheel chock assembly according to the present invention is designed specifically for chocking the wheels of a truck at a loading dock to prevent unauthorized movement of the truck away from the loading platform and thereby provide a safer working environment. Thus, the terms front and rear surfaces of the wheel chock 12 relate to the surface facing the front of the truck and the surface facing the rear of the truck. The rear wall 24 of the wheel chock is provided with a curved surface 38 which is substantially the arc of a large diameter circle to facilitate the mating of the wheel chock 12 with the circumferential tread of the truck tire. The front wall 22 is provided with a straight surface 40 so that the overall configuration of the wheel chock has a substantially triangular cross-section. The wheel chock may be formed of extruded metal or plastic having one or more internal braces 42 integrally formed therewith. The wheel chock could also have an internal honeycomb structure or be comprised of a solid lightweight material.

While the preferred embodiment has been described, variations thereto will occur to those skilled in the art within the scope of the present inventive concepts which are delineated by the following claims.

What is claimed is:

1. A wheel chock assembly comprising a wheel chock and a handle having a lower end extending along and detachably secured to the underside of said wheel chock for ground engagement and an upper end having a hand grip secured thereto with said hand grip lying in a plane substantially perpendicular to a plane of a side wall of said wheel chock, said lower end and said upper end of said handle being disposed substantially orthogonal to each other and connected by an intermediate portion.

2. A wheel chock assembly as set forth in claim 1, wherein said wheel chock has a bottom surface with downwardly projecting ribs for resting on the ground, opposed vertically extending side walls, a flat front wall and a curved rear wall defining a wheel chock having a substantially triangular cross-section, said bottom wall having a transverse groove therein adjacent said front wall, said lower end of said handle disposed in said groove and securing means extending through said bottom wall and said lower end for detachably securing said lower end of said handle to said wheel chock.

3. A wheel chock assembly as set forth in claim 1, wherein said intermediate portion of said handle is comprised of a curved portion connected to and lying in a common plane with said lower end and a bent portion between said curved portion and upper portion to offset the upper portion from the lower portion.

4. A wheel chock assembly as set forth in claim 1, wherein said hand grip is comprised of a substantially triangular member having an open center and a substantially horizontal top portion.

5. A wheel chock assembly as set forth in claim 1, wherein said handle is comprised of a hollow continuous tube.

6. A wheel chock assembly as set forth in claim 2, wherein the lower end of said handle extends downwardly from said groove the same distance as the ribs so as to rest directly on the ground.

\* \* \* \* \*